United States Patent
Meyers

(10) Patent No.: US 11,965,324 B2
(45) Date of Patent: Apr. 23, 2024

(54) DRAIN SYSTEM WITH A SEAL COMPONENT

(71) Applicant: EBBE AMERICA, LC, Clearfield, UT (US)

(72) Inventor: Lawrence G. Meyers, Clearfield, UT (US)

(73) Assignee: Ebbe America, LC, Clearfield, UT (US)

( * ) Notice: Subject to any disclaimer, the term of this patent is extended or adjusted under 35 U.S.C. 154(b) by 325 days.

(21) Appl. No.: 17/449,976

(22) Filed: Oct. 5, 2021

(65) Prior Publication Data
US 2022/0112973 A1   Apr. 14, 2022

Related U.S. Application Data

(60) Provisional application No. 63/156,108, filed on Mar. 3, 2021, provisional application No. 63/089,291, filed on Oct. 8, 2020.

(51) Int. Cl.
*E03F 5/04* (2006.01)

(52) U.S. Cl.
CPC .................. *E03F 5/0407* (2013.01)

(58) Field of Classification Search
CPC ... E03F 5/0407; E03F 2005/0414; E03F 5/04; E03F 5/0408; F16L 27/026; F16L 27/073; F16L 27/023; E04B 5/48
See application file for complete search history.

(56) References Cited

U.S. PATENT DOCUMENTS

| | | | |
|---|---|---|---|
| 3,896,511 A | 7/1975 | Cushera | |
| 5,937,450 A | 8/1999 | Jones | |
| 6,269,495 B1 * | 8/2001 | Sondrup | E03F 5/0407 |
| | | | 210/163 |
| 6,350,373 B1 | 2/2002 | Sondrup | |
| 6,381,775 B1 * | 5/2002 | Sondrup | F16L 27/053 |
| | | | 210/163 |
| 7,188,376 B2 | 3/2007 | Ortiz et al. | |

(Continued)

FOREIGN PATENT DOCUMENTS

WO   2019/034893 A1   2/2019

OTHER PUBLICATIONS

Canadian Examination Report, dated Feb. 21, 2023, from Canadian patent app. No. 3, 133,619.

*Primary Examiner* — Rodney Mintz
(74) *Attorney, Agent, or Firm* — Workman Nydegger

(57) ABSTRACT

A drain system includes a drain body attachable to a subfloor and configured for attachment to a pipe member below the subfloor. A seal component is positionable between the drain body and the pipe member and is arranged to form a seal therebetween. The seal component has a body including open upper and lower ends defining an opening therethrough for receiving a portion of the pipe member. An outer surface of the body defines an interface between the seal component and the drain body arranged to permit a first angular movement between the seal component and the drain body. An inner surface defines an interface between the seal component and the pipe member and is arranged to seal and permit a second angular movement between the seal component and the pipe member, wherein the second angular movement is different than the first angular movement.

19 Claims, 6 Drawing Sheets

(56) References Cited

U.S. PATENT DOCUMENTS

| | | | |
|---|---|---|---|
| 8,112,827 B2 | 2/2012 | Degooyer et al. | |
| 8,566,976 B2 * | 10/2013 | Evans | E03F 5/0407 4/286 |
| 11,674,294 B2 * | 6/2023 | Pilarczyk | F16L 27/107 4/679 |
| 2005/0251903 A1 * | 11/2005 | Ortiz | F16L 47/26 4/252.5 |
| 2008/0229494 A1 * | 9/2008 | DeGooyer | E03F 5/0409 4/695 |
| 2008/0290012 A1 | 11/2008 | Shih | |
| 2011/0173747 A1 * | 7/2011 | Evans | E03F 5/0407 4/679 |
| 2014/0020174 A1 * | 1/2014 | Evans | E03F 5/0407 4/679 |
| 2021/0047816 A1 * | 2/2021 | Pilarczyk | F16L 27/1017 |

* cited by examiner

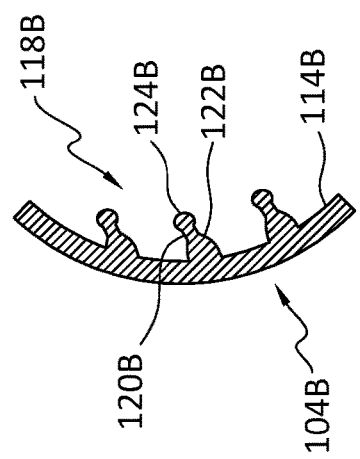
FIG. 4A
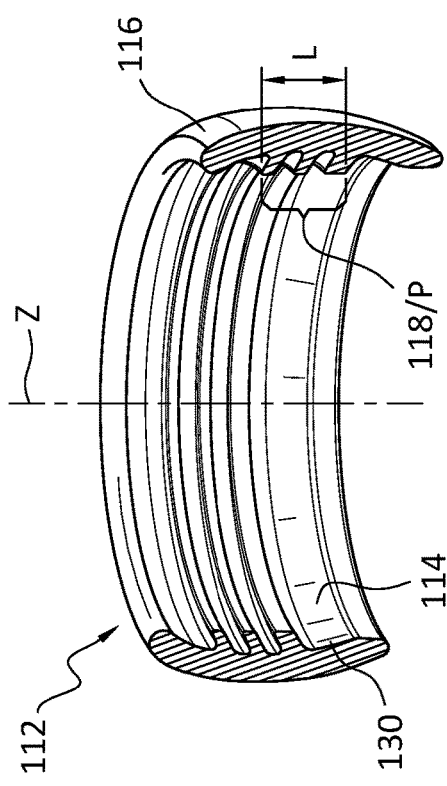
FIG. 4B
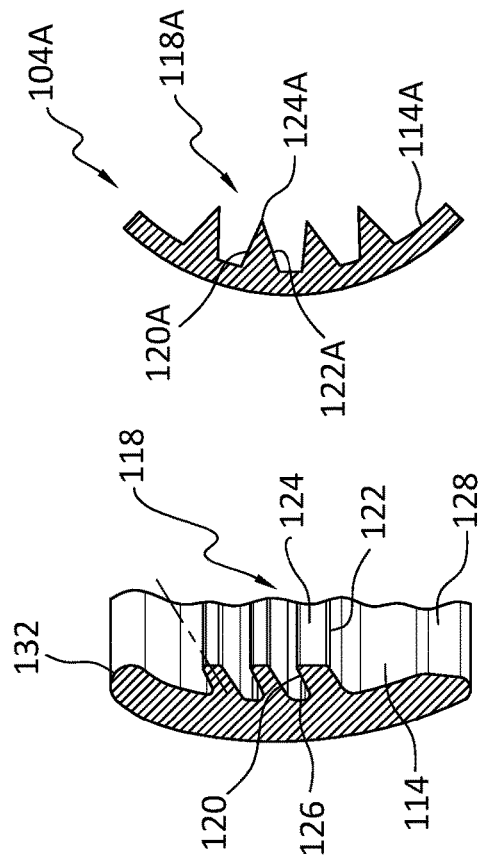
FIG. 4
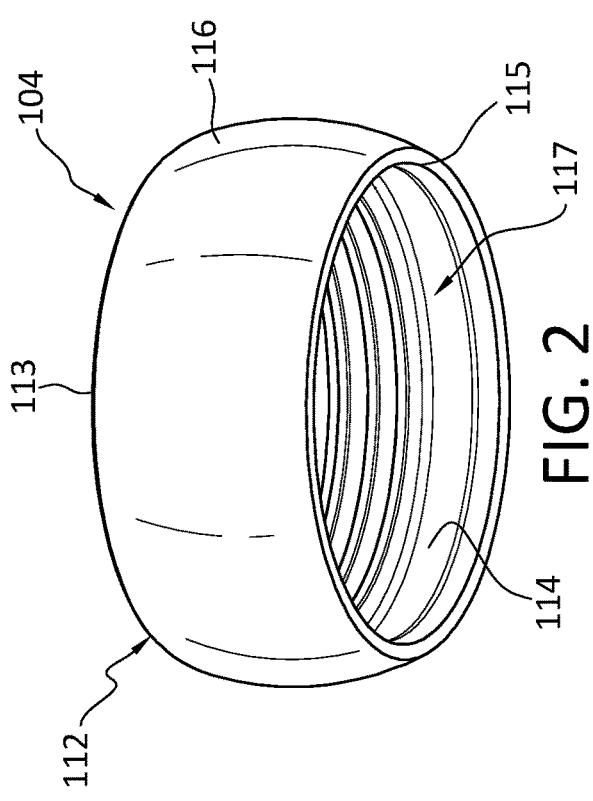
FIG. 2
FIG. 3

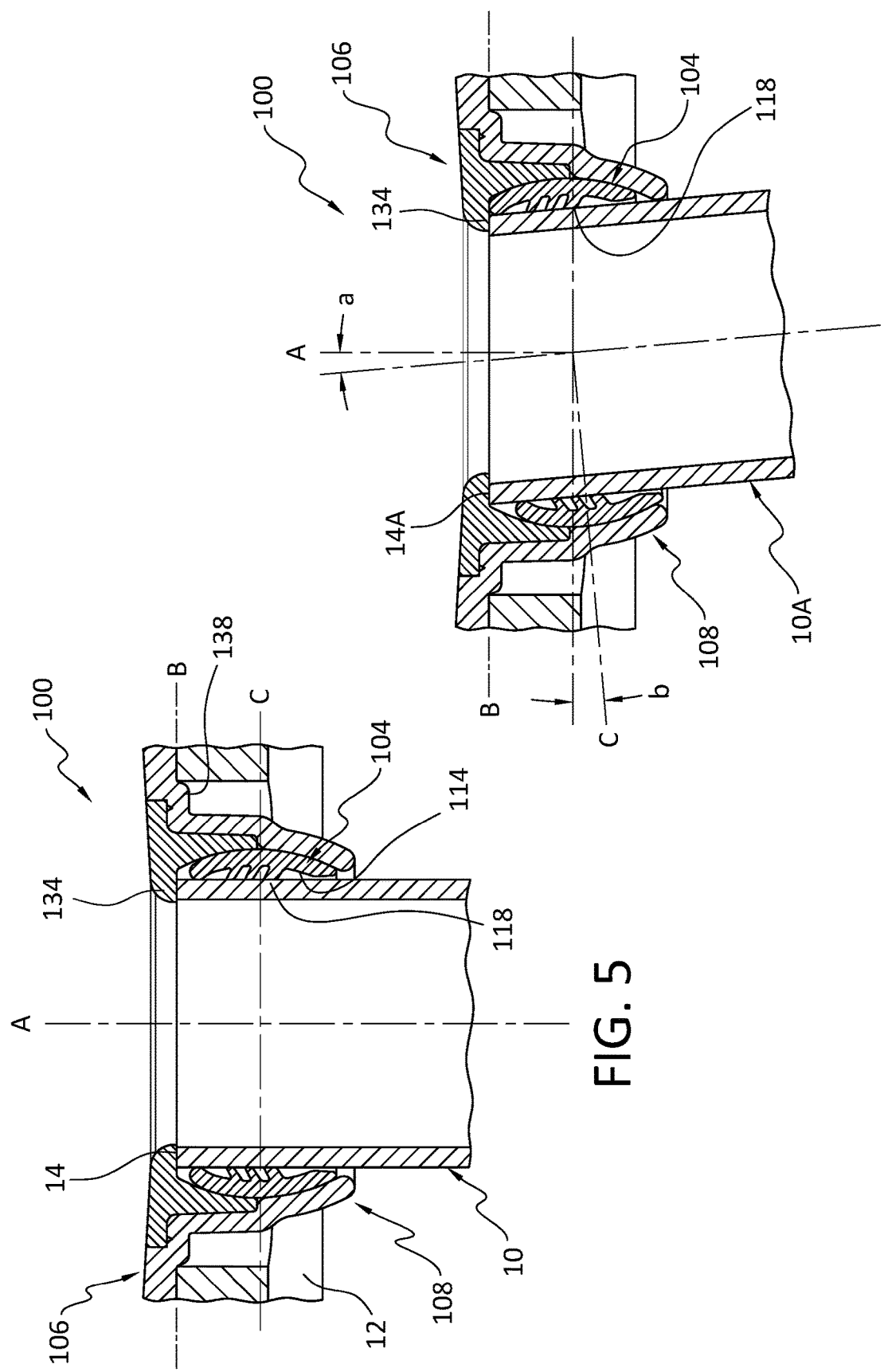

DRAIN SYSTEM WITH A SEAL COMPONENT

TECHNICAL FIELD

The disclosure relates to a drain system for use in plumbing applications.

BACKGROUND

A floor drain in its simplest form is a drain body or structure which will funnel fluids from the top of a floor to a drain pipe. A problem associated with the installation of floor drains is one of attaching the drain body to the drain pipe. Because the drain pipe is often located within a cutout in a subfloor (e.g., a wood subfloor or a concrete subfloor), the drain pipe is notoriously difficult to access during installation of the drain body. As such, attaching the drain body to the drain pipe can be challenging because the installer is working in a confined space and/or with limited vision. Such conditions can cause the installer to improperly attach the drain body to the drain pipe, which, in turn, can result in water damage due to a leaky connection between the drain pipe and the drain body. For instance, the installer can apply the wrong amount of adhesive or fail to appropriately insert the drain pipe into the drain body because of the limited access to the drain pipe below the subfloor.

Further, the drain pipe does not always conform to the cutout and is not always vertical relative to the subfloor. For instance, the drain pipe may not be perpendicular to the subfloor or a flooring material installed on the subfloor. This is problematic because drains should be at a proper height and level with the surfaces surrounding them to function properly. Drains which are not properly placed relative to surrounding surfaces may pose a safety threat and drainage troubles. Additionally, faulty connections between drains and angled drain pipes are common, which can result in costly and damaging leaks.

Accordingly, there is a need for a drain system that incorporates certain design improvements over other systems for easier and more reliable attachment to drain pipes.

SUMMARY

Embodiments of the present disclosure provide a drain system for streamlined and improved installation on a pipe member. According to an embodiment, a drain system includes a drain body attachable to a subfloor and configured for attachment to a pipe member below the subfloor. A seal component is positionable between the drain body and the pipe member and is arranged to form a seal therebetween. The seal component has a body including open upper and lower ends defining an opening therethrough for receiving a portion of the pipe member. An outer surface defines an interface between the seal component and the drain body arranged to permit a first angular movement between the seal component and the drain body. An inner surface defines an interface between the seal component and the pipe member and is arranged to seal and permit a second angular movement between the seal component and the pipe member. The second angular movement can be different than the angular movement.

According to a variation, the interface between the seal component and the drain body includes a curvature of the outer surface arranged to interface with a corresponding curvature on the drain body such that the drain body can rotate on the outer surface of the seal component.

According to a variation, the interface between the seal component and the pipe member comprises a plurality of sealing fins located along the inner surface of the seal component.

Because the interfaces of the drain system seal and allow some degree of movement between the drain system and the pipe member, an installer can quickly attach the drain system to the pipe member a form a reliable watertight seal without the requirement of fussy adhesives like in the prior art. Moreover, the interfaces can accommodate unwelcome variations in one or more angular relationships between the pipe member and a subfloor. This advantageously reduces the likelihood of faulty connections between the drain body and angled pipe members, which, in turn, reduces the likelihood of leaks and costly flood damage. It also can improve safety and drainage because the drain body can more easily sit level on a subfloor rather than being slightly raise or angled due to an angled pipe member below the subfloor of the drain body away from the subfloor.

BRIEF DESCRIPTION OF THE DRAWINGS

These and other features, aspects, and advantages of the present disclosure will become between understood regarding the following description, appended claims, and accompanying drawings.

FIG. 2 is a perspective view of the seal component of FIG. 1.

FIG. 3 is a cross section view of the seal component of FIG. 1 according to an embodiment.

FIG. 4 is another cross section view of the seal component of FIG. 1.

FIG. 4A is a cross section view of the seal component according to another embodiment.

FIG. 4B is a cross section view of the seal component according to another embodiment.

FIG. 5 is a detail cross section view of the drain system of FIG. 1.

FIG. 6 is another detail cross section view of the drain system of FIG. 1 according to another embodiment.

Figure 1:
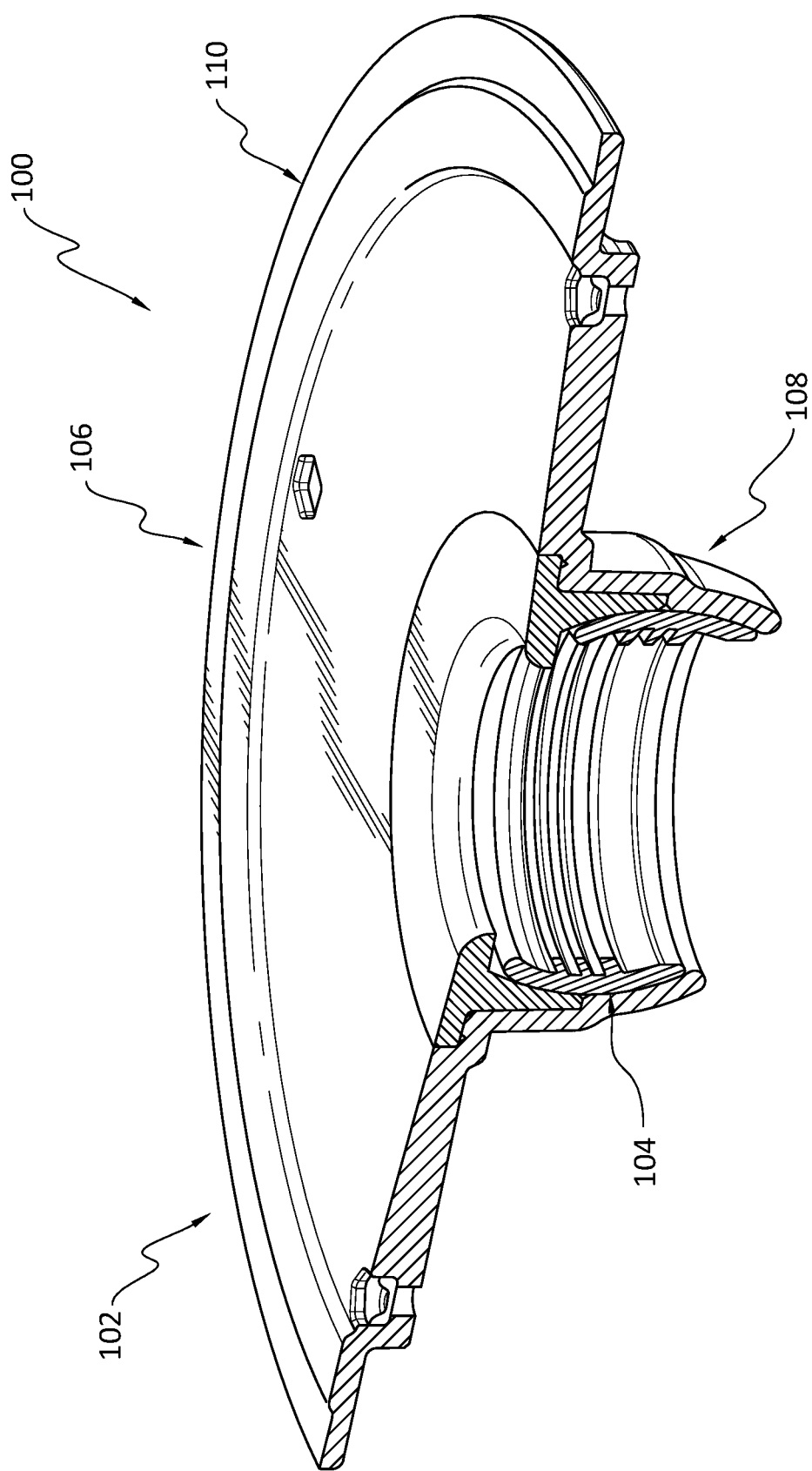
FIG. 1 is a cross section view of a drain system according to an embodiment.

The drawing figures are not necessarily drawn to scale, but instead are drawn to provide a better understanding of the components, and are not intended to be limiting in scope, but to provide exemplary illustrations. The figures illustrate exemplary configurations of drain systems, and in no way limit the structures or configurations of a drain system and components according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, that there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

Embodiments of the present disclosure advantageously provide a drain system that incorporates certain design improvements over other systems for easier and more reliable attachment to pipe members such as drain pipes. Moreover, the unique features of the drain system allow it to accommodate angular variations between a pipe member and/or surrounding surfaces, allowing an installer to quickly and properly install the drain system on the pipe member even when the pipe member is angled or misaligned relative to the surrounding surface. FIG. 1 illustrates a drain system 100 comprising a drain module 102 and a seal component 104 positionable between the drain module 102 and a pipe member such as a drain pipe extending below a subfloor. It will be appreciated the pipe member can be a standard pipe member formed of a plastic or metal material having a constant diameter.

The drain module 102 can comprise a drain body 106 attachable to the subfloor 12 and configured for attachment to the pipe member below the subfloor 12. For instance, the drain body 106 can be configured to be fixed in and to the subfloor (e.g., wood or concrete) surrounding the pipe member and can include a lower portion 108 defining an outlet configured to mate with the pipe member, and an upper portion 110. In the illustrated embodiment, the upper portion 110 is arranged to support and provide a connection area on an upper surface B of the subfloor 12 (shown in FIG. 5).

The seal component 104 is positionable between the drain body 106 and the pipe member and arranged to form a seal therebetween. In an embodiment, the seal component 104 is carried or positionable in the lower portion 108 of the drain body 106 such that the seal component 104 forms an interface between the drain body 106 and the pipe member 10 (shown in FIG. 5). As described in more detail below, the seal component 104 is arranged to advantageously quickly attach the drain system 100 to the pipe member 10 and to form a reliable watertight seal. Moreover, the unique arrangement of the seal component 104 allows the seal component 104 to reliably attach the drain body 106 to the pipe member 10 without adhesives and allowing for variations in the angular relationship between the pipe member 10 and subfloor 12, reducing the likelihood of installation errors. The seal component 104 may be formed of various elastomer materials that are known to those skilled in the art. For instance, the seal component 104 be formed of an elastomeric material arranged to resiliently compress between the lower portion 108 and an outer surface of the pipe member. In other embodiments, the seal component 104 can be formed of more than one material.

Referring to FIGS. 2 and 3, the seal component 104 includes a body 112 having an open upper end 113 and an open lower end 115 defining an opening 117 therethrough and an inner surface 114 extending about an axis Z and arranged to engage with and form a watertight seal with an outer surface of a pipe member. An outer surface 116 of the body 112 is arranged to interface with and form an attachment between the seal component 104 and the lower portion 108 of the drain body 106. As discussed below, the outer surface 116 can define a curvature arranged to interface with a corresponding curvature on the inner surface of the lower portion 108 of the drain body 106 such that the drain body 106 can rotate on the seal component 104 attached to the pipe member 10, allowing the drain system 100 to permit or generate a first angular movement to adjust its orientation relative to the pipe member 10 and sealingly attach to the pipe member 10 even when it is obliquely angled relative to the subfloor 12. In an embodiment, the curvature of the outer surface 116 can comprise a convex curvature, a spherical curvature, a frusto-spherical curvature, or any other suitable curvature.

A plurality of sealing fins 118 are located along the inner surface 114 of the seal component 104. The sealing fins 118 can protrude radially inward from the inner surface 114 and are arranged to interface with an outer surface of the pipe member 10. As seen, the sealing fins 118 collectively define a pipe sealing portion P arranged to form a seal or attachment between the seal component 104 and outer surface of the pipe member 10, providing resistance to movement between the seal component 104 and the pipe member 10.

The pipe sealing portion P defines a length L that at least in part defines an amount of adhesive friction between the seal component 104 and the pipe member. For instance, a decrease in the length L can decrease the amount of adhesive friction between the seal component 104 and the outer surface of the pipe member, and an increase in the adhesive friction between the seal component 104 and the outer surface of the pipe member. As described in more detail below, the sealing fins 118 can also be arranged to help permit or generate a rotational or rocking movement of the seal component 104 on the pipe member 10. For instance, the sealing fins 118 can help the seal component 104 tilt forward and backward along the longitudinal axis A of the pipe member 10.

The structure of the sealing fins 118 will now be described in greater detail in reference to FIG. 4 according to an embodiment. The sealing fins 118 can have a resilient configuration extending in an upwardly direction and protruding radially from the inner surface 114 of the seal component 104. Each of the sealing fins 118 includes upper and lower sections 120, 122 extending from the inner surface 114 to a peak 124 defined as the innermost extending portion of the sealing fin 118. A sealing fin 118 can have suitable cross-sectional shape but is shown with the upper and lower sections 120, 122 being substantially parallel to one another and the peak 124 can be planar or shaped to correspond to the shape of the outer surface of the pipe member 10.

The sealing fins 118 are spaced apart from one another by a gap 126 and can be arranged to resiliently deflect toward the inner surface 114 when the pipe member is inserted in the seal component 104. This resilient deflection caused by the interaction between the sealing fins 118 and the outer surface of the pipe member 10 can form a watertight seal between the pipe member and the drain system 100. Each sealing fin 118 can define a sealing surface that engages and conforms to shape of the outer surface of the pipe member, providing a watertight or substantially watertight seal.

It will be appreciated that the form of the sealing fins 118 tends to increase the sealing forces between the pipe member 10 and the sealing fins 118. For instance, each sealing fin 118 can have a slender configuration to facilitate the resilient deflection of the peaks 124 of the sealing fin 118 relative to the inner surface 114. According to an embodiment, the sealing fins 118 can be angled upwardly toward the peaks 124 (shown in FIG. 4) to help improve the attachment between the seal component 104 and the drain body 106. For instance, when the pipe member is inserted into seal component 104 and deflect the sealing fins 118 toward the inner surface 114 of the body 112, the properties of the sealing fins 118 return or force the sealing fins 118 toward their resting upwardly angle, which, in turn, resiliently bias the terminal end of the pipe member 10 and the drain body 106 toward one another when the seal component 104 is positioned in the drain body 106. This advantageously helps strengthen the sealing attachment between the pipe member and the drain system 100 and can help stabilize the location of the pipe member 10 below the subfloor 12.

It will be appreciated that the sealing fins 118 can have the same or different sizes. For instance, a lower one of the sealing fins 118 is shown having a greater width than the upper ones of the sealing fins 118. This can form a larger contact area with the outer surface of the pipe member 10. It also advantageously can increase the resistance of the lower sealing fin 118 to deflection, compared to the other sealing fins 118, which, in turn, can help stabilize the seal component 104 on the pipe member while maintaining a watertight seal therebetween.

As shown, the inner surface 114 can define a curved surface. For example, the inner surface 114 can define a concave curvature that beneficially helps the seal component 104 to maintain a sealing engagement with the pipe member as the body 112 flexes and deforms between the pipe member 10 and the lower portion 108 during installation and use. It also can provide a greater clearance between the sealing fins 118 and the inner surface 114 when the sealing fins 118 deflect toward the inner surface 114.

According to an embodiment, the inner surface 114 includes segments with different curvatures or shapes to help maintain and/or adjust the location of the seal component 104 on the pipe member 10. For example, the concave curvature of the inner surface 114 can transition into a lower segment 128 at or near the lower end 115. The lower segment 128 can have a cylindrical or other shape arranged to vary a contact area between the body 112 and the pipe member relative to the engagement area between the seal component 104 and the pipe member 10 above the lower segment 128. This can help anchor or locate the seal component 104 on the pipe member. This also can help create a differential in the adhesive friction between the seal component 104 and the pipe member 10, which, in turn, can allow the seal component 104 to selectively pivot or tilt on the pipe member 10 as the sealing fins 118 deflect relative to the inner surface 114.

In other embodiments, the lower segment 128 can provide a visual or tactical indicator for an installer to help ensure proper orientation of the seal component 104 onto the pipe member 10 with the sealing fins 118 angled upwardly toward the peaks 124. Optionally, the seal component 104 can include a visual or tactical indicator comprising symbols or wording 130 (e.g., "DOWN") to help ensure proper orientation of the seal component 104 during installation. According to an embodiment, an upper segment 132 at or near the upper end 113 can have a generally rounded shape configured to slide and seal against the outer surface of the pipe member 10.

The sealing fins 118 could be formed of the same material as the body 112 and created integrally in one piece with the body 112 during molding or forming of the body 112, or alternatively, could be formed of a softer or stiffer material or a material more suitable for a seal than the material forming the body, and then secured to the body 112.

The sealing fins 118 are shown comprising three sealing fins but can comprise any suitable numbers of sealing fins. Because the seal component 104 includes a plurality of sealing fins 118 distributed along a height of the inner surface 114 to form the pipe sealing portion P, the sealing fins 118 can substantially reduce the likelihood of fluid escaping through the connection between the seal component 104 and the pipe member 10 by forming multiple barriers or levels through which the fluid must pass to leak through the drain system 100. This advantageously can increase the reliability of any drain system within which the seal component 104 is being used.

With reference to FIGS. 4A and 4B, alternative forms of the sealing fins shown in FIGS. 1-4 are illustrated. As shown in FIG. 4A, a seal component 104A can include sealing fins 118A with have radially pitched sections 120A, 122A, extending at different angles relative to the inner surface 114A. The pitched sections 120A, 122A may converge at a peak 124A defining a point. The different angles of the sealing fins 118A allows the seal component 104A to have a reversible configuration that can be sealingly attached to the pipe member 10 and the drain body 106. For instance, the seal component 104A can be installed on an outer surface of the pipe member 10 by inserting the pipe member 10 through a first end or a second end of the seal component 104A. This allows the seal component 104A to be attached to the pipe member 10 with the first end located toward a terminal end of the pipe member 10 or with the second end located toward the terminal end of the pipe member 10.

In another configuration of the sealing fin illustrated in FIG. 4B, the pitched sections of a seal component 104B may be replaced by curvilinear sections 120B, 122B that extend from the inner surface 114B to a peak 124B. The peak 124B can define a bulbous or rounded shape. Like other embodiments, the sealing fins 118B are angled upwardly from the inner surface 114B toward the peak 124B. When the pipe member 10 is inserted through the seal component 104B, the curvilinear sections 120B, 122B can help facilitate deflection of the sealing fins 118B toward the inner surface 114B.

FIG. 5 shows the drain system 100 installed on the subfloor 12 and attached to the pipe member 10 according to an embodiment. With the seal component 104 positioned in the lower portion 108 of the drain body 106, an installer can position the drain body 106 over a cutout in the subfloor 12 and force the drain body 106 down onto pipe member 10. The lower portion 108 extends downwardly through the subfloor 12 to receive the pipe member 10. As the pipe member 10 moves through the seal component 104, the sealing fins 118 engage the outer surface of the pipe member 10 and deflect toward the inner surface 114 of the seal component 104 to form a watertight or substantially watertight seal between the seal component 104 and the pipe member 10. The sealing fins 118 serve to provide a sealing effect by their resilient compression between the inner surface of the seal component 104 and the outer surface of the pipe member 10. As discussed above, the upward angle of the sealing fins 118 from the inner surface 114 can help bias or pull the drain body 106 and a terminal end 14 of the pipe member 10 together. This advantageously helps an installer quickly attach the drain system 100 to the pipe member 10 and to form a reliable watertight seal without the requirement of fussy adhesives like in the prior art.

In an embodiment, the terminal end 14 of the pipe member 10 is cut flush with an upper surface B of the subfloor 12 such that when the drain body 106 is forced onto the pipe member 10, the terminal end 14 of the pipe member 10 engages a stop formed by a collar portion 134 of the drain body 106 to indicate the pipe member 10 is properly or fully inserted in the drain body 106 and the drain body 106 is properly located on the subfloor 12, helping to reduce the likelihood of a leaky connection. As seen, when the drain body 106 is attached to the pipe member 10, the collar portion 134 extends over the top of the terminal end 14 of the pipe member 10 to direct water and debris from the drain body 106 into the opening of the pipe member 10, and away from the outer surface of the pipe member 10 and the seal component 104. The drain body 106 can also include a portion 138 extending around the drain body 106. The portion 138 is arranged to fit and extend downwardly into the cutout in the subfloor 12, helping to locate the drain body 106 on the pipe member 10 and the subfloor surrounding the cutout.

When the pipe member 10 is vertical or a long axis A of the pipe member 10 is substantially normal the upper surface B of the subfloor 12, the seal component 104 can be located space between the pipe member 10 and the lower portion 108 such that a transverse axis C of the seal component 104 is parallel or substantially parallel to the upper surface B of the subfloor 12.

According to an embodiment, the drain system 100 advantageously can accommodate angular variations between the pipe member 10 and the subfloor 12 by generating a first angular movement between the lower portion 108 and the seal component 104 and a second angular movement between the seal component 104 and the pipe member 10 that is different than the first angular movement. For instance, the first angular movement can comprise the lower portion 108 rotating on and around the outer surface 116 of the seal component 104, and the second angular movement can comprise the seal component 104 pivoting on at least some of the sealing fins 118 engaged with the outer surface of the pipe member 10. These different movements or angular adjustments within the drain system 100 can allow an installer to quickly and properly install the drain system 100 on the pipe member 10 even when the pipe member 10 is angled or tilted relative to the upper surface B of the subfloor 12.

The interface between the outer surface 116 of the seal component 104 and the lower portion 108 can permit or generate the first angular movement or first angular adjustment between the seal component 104 and the lower portion 108 of the seal component 104, and the interface between the inner surface 114 of the seal component 104 and the pipe member 10 can be provide the second angular movement or second angular adjustment between the seal component 104 and the pipe member 10. As discussed above, the first and second angular movements or adjustments can be different to permit or generate different alignments within the drain system 100. Because the interfaces have different shapes and structures, the first and second angular movements or adjustments can be about different points of rotation.

Referring to FIG. 6, the first angular movement between the seal component 104 and the lower portion 108 can allow the drain body 106 sit level on the subfloor 12 when attached to a pipe member 10A that is not perpendicular or normal to the upper surface B of the subfloor 12. The second angular movement between the seal component 104 and the pipe member 10A can allow the seal component 104 to tilt, rock, or pivot along the longitudinal axis A of the pipe member 10A within the lower portion 108 while maintaining sealing contact with the pipe member 10A and the lower portion 108, which, in turn, allows the drain body 106 sealing attach to the pipe member 10A.

When the drain body 106 is forced down onto the pipe member 10A and attached to the subfloor 12, the interaction or interface between the seal component 104 and the lower portion 108 can permit or generate the first angular movement, forcing or allowing the concave inner surface of the lower portion 108 to rotate on the curvature of the outer surface of the seal component 104. The interaction between the outer surface of the pipe member 10A and the inner surface of the seal component 104 can permit or generate the second angular movement, pivoting the seal component 104 about the sealing fins 118 engaged with the outer surface of the pipe member 10. This, in turn, rocks or shifts the seal component 104 between the drain body 106 and the pipe member 10A. The angular orientation of the drain body 106 and the angular orientation of the seal component 104 can thus both adjust to quickly and reliable attach the drain system 100 to the pipe member 10.

It will be appreciated that the concave curvature of the inner surface 114 of the seal component 104 can provide a greater clearance between the sealing fins 118 and the inner surface 114 when the sealing fins 118 deflect or move, which, in turn, can vary the magnitude of the second angular movement within the drain system 100. The concave curvature of the inner surface 114 can also form or socket for the seal component 104 or a space or clearance between the seal component 104 and the lower portion 108 for the seal component 104 tilt up and/or down between the lower portion 108 and the pipe member 10. Moreover, the concave curvature can guide the second angular movement.

The combination of the first and second angular movements and the material properties of the seal component 104 can allow the drain system 100 to maintain sealing contact with the pipe member 10A even when angled and to be installed level on the subfloor 12. Optionally, a sealant or lubricant can be supplied between the outer surface of the seal component 104 and the inner surface of the lower portion 108. This can help seal and facilitate the first angular movement between the seal component 104 and the lower portion 108.

It will be appreciated that the first and second angular movements can be simple or complex. For instance, the first angular movement can comprise a rotation in multiple planes and the second angular movement can comprise a forward and backward rocking movement along the longitudinal axis A of the pipe member 10. In other embodiments, the first angular movement can include more degrees of freedom than the second angular movement. For instance, the first angular movement can allow for three degrees of freedom and the second angular movement can allow for less than three degrees of freedom. In other embodiments, it will be appreciated that the first angular movement can impact the second angular movement. For instance, the tilting of the seal component 104 on the pipe member 10 can result in rotation between the lower portion 108 and the seal component 104. In an embodiment, the first angular movement and the second angular movement can be in a same direction. For instance, the first angular movement and the second angular movement be in a counterclockwise direction. In other embodiments, the first angular movement and the second angular movement can be in different directions. For instance, the first angular movement can be in a first rotational direction and the second angular movement can be in a second rotational direction different from the first rotational direction.

The drain system 100 beneficially can reduce the likelihood of faulty connections between the drain body 106 and angled pipe members, which, in turn, reduces the likelihood of leaks and costly flood damage. It also improves safety and drainage of the drain system 100 because the drain body 106 can more easily sit level on the subfloor 12 rather being slightly raised or angled due to an angled pipe member below the subfloor 12 forcing a portion of the drain body 106 away from the subfloor 12.

In an embodiment, the first and second angular movements within the drain system 100 can sealing attach to pipe member 10A having a longitudinal axis A forming an angle (a) between about 1 degree and about 8 degrees (e.g., up to about 5 degrees) from vertical. The first and second angular movements can be different such that the angle (b) between horizontal and the transverse axis C of the seal component 104 can be different than the angle (a) between the longitudinal axis A of the pipe member 10A and vertical. For instance, the angle (b) can be greater than the angle (a). In other embodiments, the pipe member 10A and the seal component 104 can be angled in a same direction and at different angles. The other embodiments, the first and second angular movements can be the same or similar.

Like other embodiments, the terminal end 14A of the pipe member 10A can be cut flush with an upper surface B of the subfloor 12 such that when the drain body 106 is forced onto the pipe member 10A, the terminal end 14A of the pipe member 10A engages an underside of a collar portion 134 of the drain body 106 forming a stop, providing an indicator that the pipe member 10A is properly or fully inserted in the drain body 106 and the drain body 106 is properly located on the subfloor 12. This advantageously can help to reduce the likelihood of a leaky connection between the drain body 106 and the pipe member 10A. In addition, a lower end of the lower portion 108 can include a rounded or contoured edge to help facilitate insertion of the pipe member into the seal component 104. The collar portion 134 can be formed integral with or separate from the other portions of the drain body 106.

Figure 7:
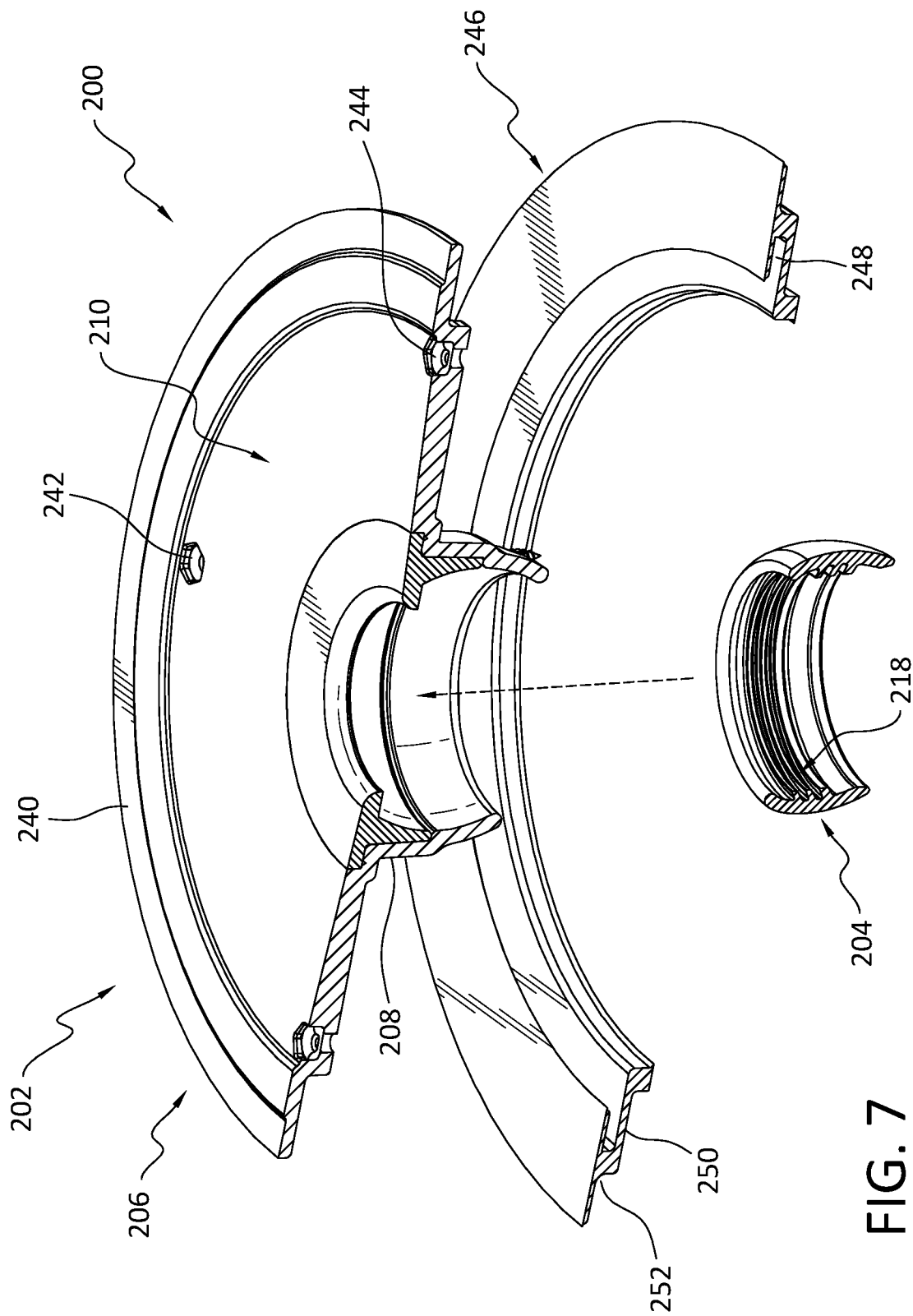
FIG. 7 is an exploded view of a drain system according to another embodiment.

FIG. 7 illustrates another embodiment of a drain system 200 including a seal component 204 and a drain module 202 comprising a drain body 206 configured to quickly and reliably attach the drain system 200 to pipe member in a floor. It will be appreciated that the drain system 200 can include the same or similar features as the other embodiments described herein. Like the previous embodiments, the seal component 204 is positionable in a lower portion 208 of the drain body 206 such that the seal component 204 forms an interface between the drain body 206 and a pipe member. The seal component 204 includes a plurality of sealing fins 218 forming a sealing portion along an inner surface and a curvature on the outer surface that interfaces with a lower portion 208 of the seal component 204.

The interface between the outer surface of the seal component 204 and the lower portion 208 can permit or generate a first angular movement in the drain system 200 and the interface between the sealing fins 218 and the pipe member can permit or generate a second angular movement in the drain system 200 that is different than the first angular movement. The combination of the first and second angular movements can allow the seal component 204 to reliably seal the drain body 206 to the pipe member without adhesives and accommodate variations in the angular relationship between the pipe member and a subfloor, reducing the likelihood of leaks and installation errors.

In the illustrated embodiment, an upper portion 210 of the drain body 206 defines an opening and a flange 240 extending around the opening. The flange 240 can be a bonding flange sized and configured to be attached to a subfloor or pressed against a thin set mortar and optionally to provide an adhering or bonding surface for bonding the drain body 206 to a thinset mortar. The flange 240 can define a plurality of openings 242 configured to receive one or more fasteners 244 for attaching the drain body 206 to the subfloor. Optionally, one or more seals 246 can be associated with the openings 242 and arranged to seal on fasteners extending through the openings 242, reducing the likelihood of leakage through the openings 242. It will be appreciated that a geometry of the upper surface of the upper portion 210 can be configured to support a movable support frame for a drain cover or a drain cover over the opening.

The drain system 200 can include a pan collar 250 arranged to the connect the drain body 206 to one or more waterproof panels. In an embodiment, an inner portion of the pan collar 250 can define a groove 252 extending circumferentially and sized and configured to receive an outer portion of the flange 240 on the drain body 206, and the outer portion of the pan collar 250 can define a joint comprising a lower recess 254 and an upper recess 256 offset and configured to receive and mate with a low-profile shower pan. An example of a low-profile shower that may be compatible with the pan collar 250 is manufactured by and available from HYDRO-BLOK®. While the drain system 200 is shown configured for use with a waterproof shower pan, in other embodiments, the drain system 200 can be configured for use with a mortar bed or other flooring system. The drain body 206 and the pan collar 250 can be formed of a molded plastic or any other suitable material.

Figure 8:
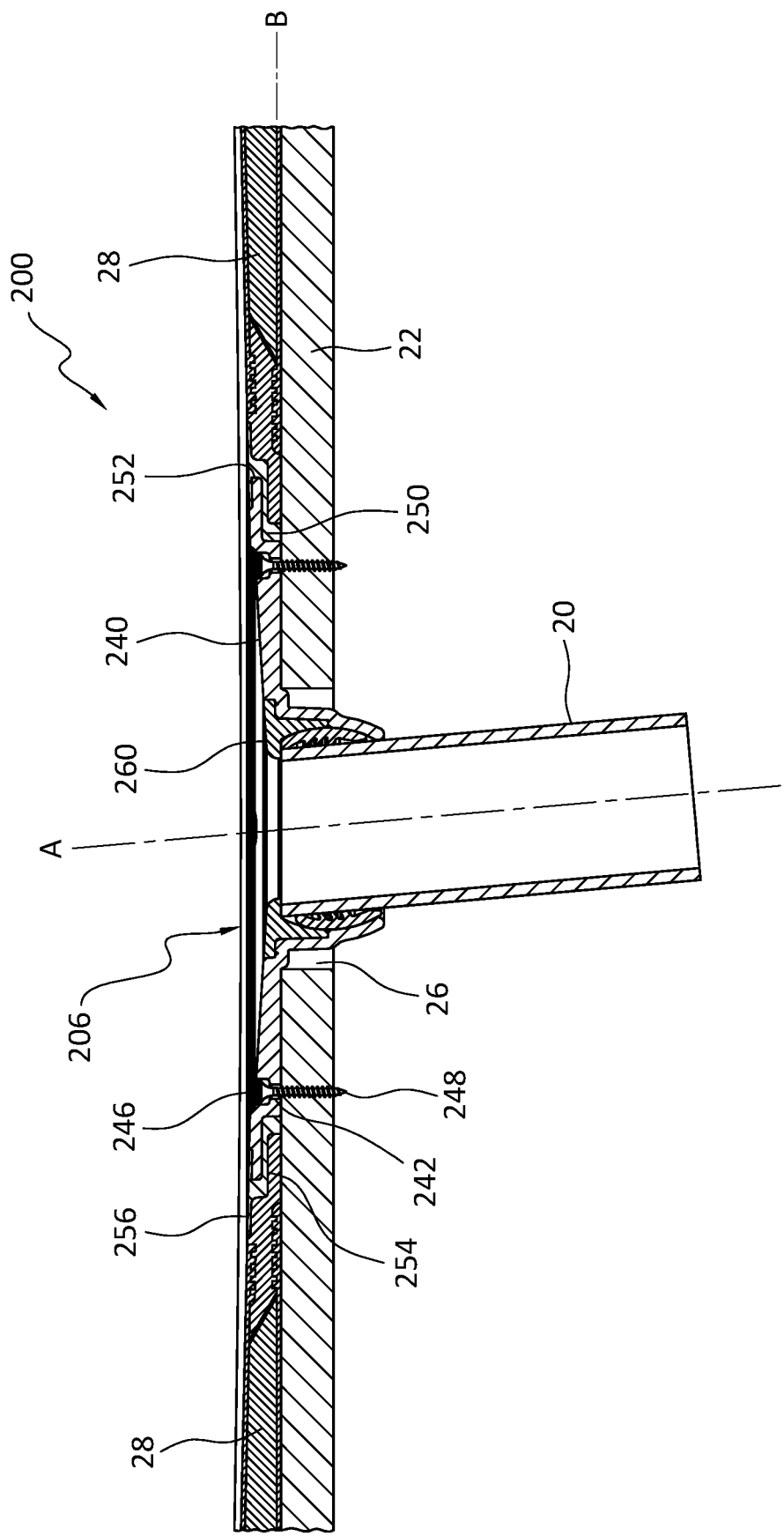
FIG. 8 is a cross section view of the drain system of FIG. 7 installed according to another embodiment.

FIG. 8 shows the drain system 200 installed in a wet or shower environment according to an embodiment. As seen, the drain body 206 is installed in a cutout 26 in a subfloor 22 such that an outlet of the lower portion 208 attaches to the pipe member 20 below the subfloor 22. It will be appreciated the pipe member 20 can be a standard pipe member formed of a plastic or metal material having a constant diameter. The drain body 206 can be secured to the subfloor 22 via plurality of fasteners 248.

As discussed above, the one or more seals 246 can seal on the fasteners 248 in the openings 242 to prevent leakage through the drain body 206. The flange 240 supports the drain body 206 in the cutout 26 on the subfloor 22 and provides an attachment surface between the drain body 206 and the subfloor 22. One or more waterproof panels 28 are installed around the drain body 206 to form a drainage slope toward the drain body 206. In an embodiment, the one or more waterproof panels 28 can comprise a waterproof shower pan.

The pan collar 250 can connect the drain body 206 and the one or more waterproof panels 28. As seen, the outer portion of the flange 240 is received in the groove 252 defined by the pan collar 250, forming a joint and attaching the pan collar 250 to the drain body 206. It will be appreciated that this joint between the pan collar 250 and the one or more waterproof panels can comprise a waterproof joint. The one or more waterproof panels 28 are received in the lower recess 254 and/or upper recess 256 of the pan collar 250, forming a waterproof attachment between the pan collar 250 and the one or more waterproof panels 28. Together the drain body 206, the pan collar 250, and the one or more waterproof panels 28 can form a waterproof shower or other wet area system that can easily and reliably attach to the pipe member 20. One or more tiles or other flooring materials and drain cover can be installed with the drain system 200.

A terminal end of the pipe member 20 can be cut flush or substantially flush with an upper surface B of the subfloor 22 such that a collar portion 260 of the drain body 206 extends over the terminal end of the pipe member 20 and forms a stop when the drain body 206 is fastened to the subfloor 22. The collar portion 260 defines a rounded or fillet edge extending around the pipe member 20 that directs fluid into the opening of the pipe member 20, and away from the seal component 204.

Like in other embodiments, the interfaces between the seal component 204, the lower portion 208, and the pipe member 20 advantageously allow the drain system 200 to accommodate angular variations between the pipe member 20 and the subfloor 22. This can allow an installer to quickly and properly install the drain system 200 on the pipe member 20 even when the pipe member 20 is angled or tilted relative to the upper surface B of the subfloor 22.

Figure 9:
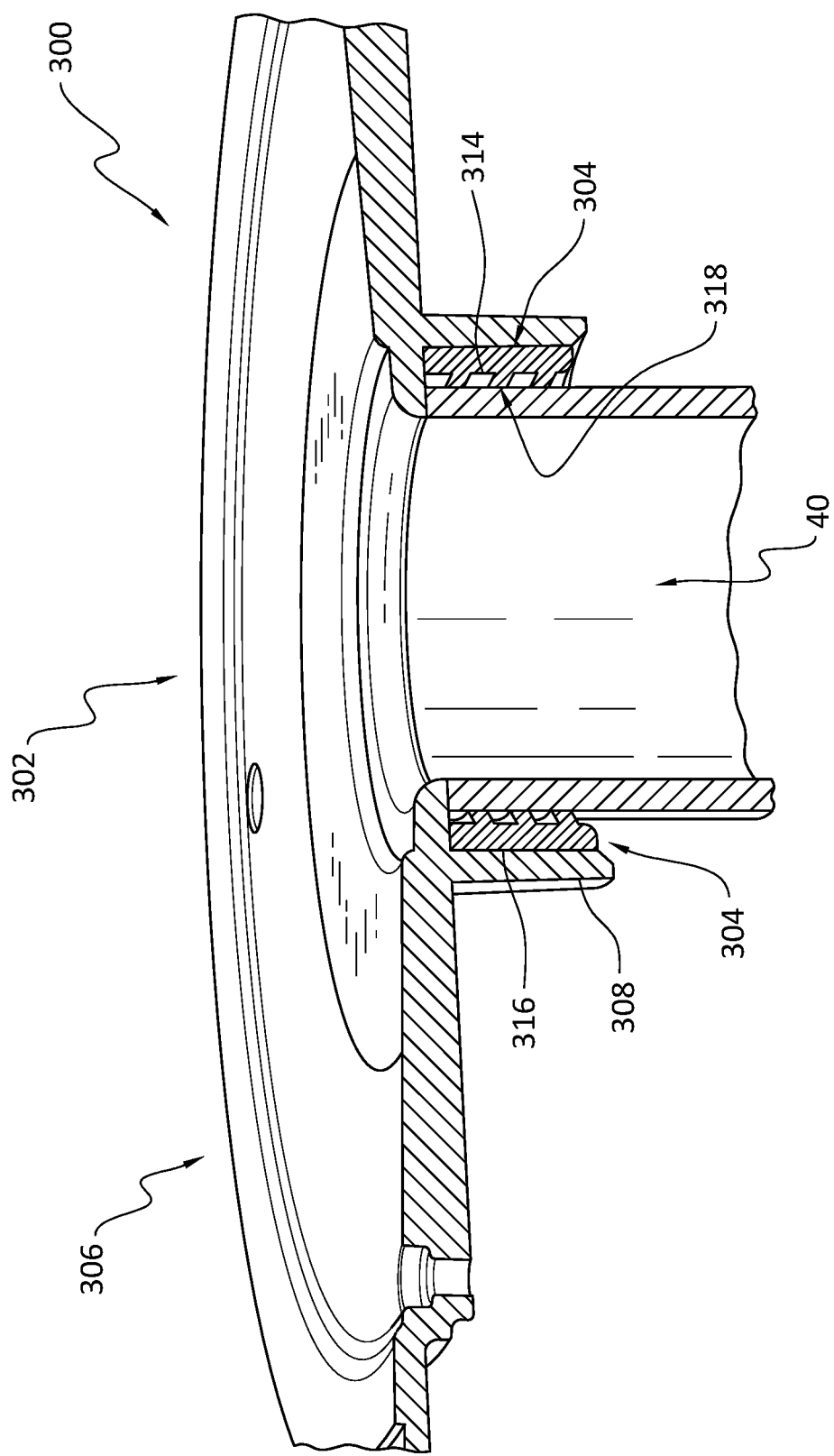
FIG. 9 is a cross section view of a drain system according to another embodiment.

FIG. 9 illustrates another embodiment of a drain system 300 including a seal component 304 and a drain module 302 comprising a drain body 306 configured to attach the drain system 300 quickly and reliably to a pipe member 40 in a floor. It will be appreciated that the drain system 300 can include the same or similar features as the other embodiments described herein. While other embodiments of the seal component are showing having spherical or frusto-spherical curvature, it will be appreciated the seal component can have other suitable curvatures. For example, the seal component 304 can include a tubular or cylindrical body defining an inner surface 314 configured to interface with the pipe member 40. Moreover, the seal component 304 can have a reduced height relative to the other embodiments, generally corresponding to a height of the lower portion 308.

It will be appreciated the pipe member 40 can be a standard pipe member formed of a plastic or metal material having a constant diameter. The seal component 304 can include an outer surface 316 facing away from the inner surface 314 and configured to interface with the inner surface of the lower portion 308 of the drain body 306. The lower portion 308 can also have a cylindrical or tubular configuration. The seal component 304 can comprise an elastomeric material or polymeric rubber material configured to conform to and seal against the outer surface of the pipe member 40. Like in other embodiments, the inner surface 314 of the seal component 304 can include a plurality of sealing fins 318 configured to engage with the outer surface of the pipe member 40. The engagement and deflection of the sealing fins 318 allows the seal component 304 to quickly form and maintain a seal between the seal component 304 and the pipe member 40. In an embodiment, the interface between the sealing fins 318 and the outer surface of the pipe member 40 can permit or generate movement between the seal component 304 and the pipe member 40. For example, the seal component 304 can move up and down on the sealing fins 318 along a longitudinal axis of the pipe member 40. The sealing fins 318 are angled upwardly from the inner surface 314 to help maintain the attachment between the seal component 304 and the pipe member 40.

As illustrated above, embodiments of the present disclosure thus provide a drain system that offers easier and more reliable attachment to pipe members below a subfloor. Moreover, the unique interfaces formed in the drain system allow the drain system to accommodate angular variations between the pipe member and a surrounding subfloor. This advantageously allows an installer to quickly and properly install the drain system on the pipe member even when the pipe member is angled or misaligned relative to the subfloor.

The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A drain system comprising:
   a drain body configured to be attached to a subfloor and to a pipe member below the subfloor; and
   a seal component configured to be positioned between the drain body and the pipe member and arranged to form a seal therebetween, the seal component having a body including:
      open upper and lower ends defining an opening therethrough for receiving a portion of the pipe member;
      an outer surface defining a first interface between the seal component and the drain body arranged to permit a first angular movement between the seal component and the drain body; and
      an inner surface defining a second interface between the seal component and the pipe member and arranged to seal and permit a second angular movement between the seal component and the pipe member, wherein the second interface between the seal component and the pipe member comprises a plurality of sealing fins, wherein the second angular movement is different than the first angular movement.

2. The drain system of claim 1, wherein the first interface between the seal component and the drain body comprises a curvature of the outer surface arranged to interface with a corresponding curvature on the drain body such that the drain body is configured to rotate on the outer surface of the seal component.

3. The drain system of claim 2, wherein the curvature of the outer surface of the seal component comprises a spherical curvature.

4. The drain system of claim 2, wherein the curvature of the outer surface of the seal component comprises a frusto-spherical curvature.

5. The drain system of claim 2, wherein the curvature on the drain body comprises a concave curvature.

6. The drain system of claim 1, wherein the plurality of sealing fins are located along a periphery of the inner surface of the seal component.

7. The drain system of claim 6, wherein the sealing fins protrude radially inward from the inner surface and are arranged to engage and seal against an outer surface of the pipe member when the pipe member is received in the seal component.

8. The drain system of claim 6, wherein the sealing fins are arranged to resiliently deflect toward the inner surface when the pipe member is inserted in the seal component.

9. The drain system of claim 6, wherein the sealing fins resiliently bias the pipe member and the drain body toward one another.

10. The drain system of claim 6, wherein one or more of the sealing fins have different sizes.

11. The drain system of claim 6, wherein a lower one of the sealing fins forms a larger contact area with the outer surface of the pipe member than other of the sealing fins.

12. The drain system of claim 6, wherein the sealing fins collectively define a pipe sealing portion arranged to form a seal or attachment between the seal component and an outer surface of the pipe member.

13. The drain system of claim 12, wherein the pipe sealing portion defines a length that at least in part defines an amount of adhesive friction between the seal component and the pipe member.

14. The drain system of claim 6, wherein each sealing fin includes upper and lower sections extending from the inner surface to a peak forming an innermost extending portion of the sealing fin.

15. The drain system of claim 14, wherein one or more of the sealing fins are angled upwardly from the inner surface toward the peaks.

16. A drain system comprising:
- a drain body configured to be attached to a subfloor and to a pipe member below the subfloor; and
- a seal component composed of an elastomeric material configured to be positioned between the drain body and the pipe member and arranged to form a seal therebetween, the seal component having a body including:
  - open upper and lower ends defining an opening therethrough for receiving a portion of the pipe member;
  - an outer surface defining an interface between the seal component and the drain body; and
  - an inner surface including a plurality of sealing fins protruding radially inward from the inner surface to interface between the seal component and the pipe member, the sealing fins arranged to seal and permit an angular movement between the seal component and the pipe member.

17. The drain system of claim 16, wherein the sealing fins are deflectable toward the inner surface of the seal component.

18. A drain system comprising:
- a seal component composed of an elastomeric material configured to be positioned between a discrete drain body and a discrete pipe member and arranged to form a seal therebetween, the seal component having a body including:
  - open upper and lower ends defining an opening therethrough receiving a portion of the pipe member;
  - an outer surface defining a first interface between the seal component and the drain body arranged to permit a first angular movement between the seal component and the drain body; and
  - an inner surface including a plurality of sealing fins protruding radially inward from the inner surface defining a second interface between the seal component and the pipe member, the sealing fins arranged to seal and permit a second angular movement between the seal component and the pipe member, wherein the second angular movement is different than the first angular movement.

19. The drain system of claim 7, wherein the sealing fins collectively define a pipe sealing portion arranged to form a seal or attachment between the seal component and an outer surface of the pipe member.

\* \* \* \* \*